US012339606B2

(12) United States Patent
Aoyagi

(10) Patent No.: US 12,339,606 B2
(45) Date of Patent: Jun. 24, 2025

(54) IMAGE FORMING APPARATUS INCLUDING PLURALITY OF PHOTORECEPTORS AND CONTROLLING A LIGHT EMISSION TIMING IN A ROTATING DIRECTION OF A CORRESPONDING PHOTORECEPTOR

(71) Applicant: CANON KABUSHIKI KAISHA, Tokyo (JP)

(72) Inventor: Takeshi Aoyagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/540,042

(22) Filed: Dec. 14, 2023

(65) Prior Publication Data

US 2024/0210867 A1 Jun. 27, 2024

(30) Foreign Application Priority Data

Dec. 21, 2022 (JP) ................................ 2022-204640

(51) Int. Cl.
*G03G 15/00* (2006.01)
*G03G 21/14* (2006.01)

(52) U.S. Cl.
CPC ....... *G03G 15/5008* (2013.01); *G03G 15/505* (2013.01); *G03G 21/145* (2013.01); *G03G 2215/0008* (2013.01); *G03G 2215/00645* (2013.01); *G03G 2215/0412* (2013.01)

(58) Field of Classification Search
USPC ........................................................... 399/78
See application file for complete search history.

(56) References Cited

U.S. PATENT DOCUMENTS 8,953,188 B2 2/2015 Aoyagi
2012/0163846 A1* 6/2012 Andoh ............... G03G 15/0189 399/302

FOREIGN PATENT DOCUMENTS

EP 2096502 A2 * 9/2009 ......... G03G 15/0131
JP H05-341589 A 12/1993

* cited by examiner

*Primary Examiner* — Quana Grainger
(74) *Attorney, Agent, or Firm* — VENABLE LLP

(57) ABSTRACT

An image forming apparatus includes: a plurality of photoreceptors; a plurality of exposure heads provided so as to correspond to the plurality of photoreceptors, respectively, each of the plurality of exposure heads including a plurality of light emitting units configured to emit light for exposing the corresponding photoreceptor, the plurality of light emitting units being arranged along a rotation axis line of the corresponding photoreceptor; and a generation unit configured to generate a line synchronization signal for each of the plurality of exposure heads to control a light emission timing in a rotating direction of the corresponding photoreceptor, the generation unit being configured to adjust a cycle of the line synchronization signal in accordance with each of the plurality of exposure heads.

9 Claims, 11 Drawing Sheets

IMAGE FORMING APPARATUS INCLUDING PLURALITY OF PHOTORECEPTORS AND CONTROLLING A LIGHT EMISSION TIMING IN A ROTATING DIRECTION OF A CORRESPONDING PHOTORECEPTOR

BACKGROUND OF THE INVENTION

Field of the Invention

The present invention relates to a technique for suppressing the influence of fluctuation in the circumferential speed of a photoreceptor.

Description of the Related Art

An electrophotographic image forming apparatus forms an electrostatic latent image on a photoreceptor by exposing light on the rotationally driven photoreceptor, and forms an image (toner image) on the photoreceptor by developing the electrostatic latent image with toner. The image formed on the photoreceptor is directly transferred to a sheet such as recording paper, or is transferred to a sheet through an intermediate transfer body. The formation of the electrostatic latent image on the photoreceptor is performed in units of lines in a direction intersecting the rotating direction of the photoreceptor. That is, an electrostatic latent image corresponding to an image to be formed on one sheet is formed on the photoreceptor by repeating light exposure of a line in a direction intersecting the rotating direction of the photoreceptor while rotating the photoreceptor. The direction in which the lines are formed is referred to as a sub-scanning direction. In the photoreceptor, the sub-scanning direction corresponds to the circumferential direction (rotating direction) of the photoreceptor.

Here, when the circumferential speed of the photoreceptor with respect to the speed of the sheet or the intermediate transfer body (hereinafter, also referred to as surface speed) fluctuates, expansion or contraction of an image to be transferred to the intermediate transfer body or the sheet may occur. The fluctuation in the circumferential speed of the photoreceptor may be caused by, for example, eccentricity of the photoreceptor. Japanese Patent Laid-Open No. 5-341589 discloses a configuration for mechanically suppressing the fluctuation of the surface speed of a photoreceptor due to eccentricity.

In the configuration of Japanese Patent Laid-Open No. 5-341589, it is necessary to increase the machining accuracy of each component and the mounting accuracy thereof, but the accuracy is limited.

SUMMARY OF THE INVENTION

According to an aspect of the present invention, an image forming apparatus includes: a plurality of photoreceptors; a plurality of exposure heads provided so as to correspond to the plurality of photoreceptors, respectively, each of the plurality of exposure heads including a plurality of light emitting units configured to emit light for exposing the corresponding photoreceptor, the plurality of light emitting units being arranged along a rotation axis line of the corresponding photoreceptor; and a generation unit configured to generate a line synchronization signal for each of the plurality of exposure heads to control a light emission timing in a rotating direction of the corresponding photoreceptor, the generation unit being configured to adjust a cycle of the line synchronization signal in accordance with each of the plurality of exposure heads.

Further features of the present invention will become apparent from the following description of exemplary embodiments with reference to the attached drawings.

DESCRIPTION OF THE EMBODIMENTS

Figure 1:
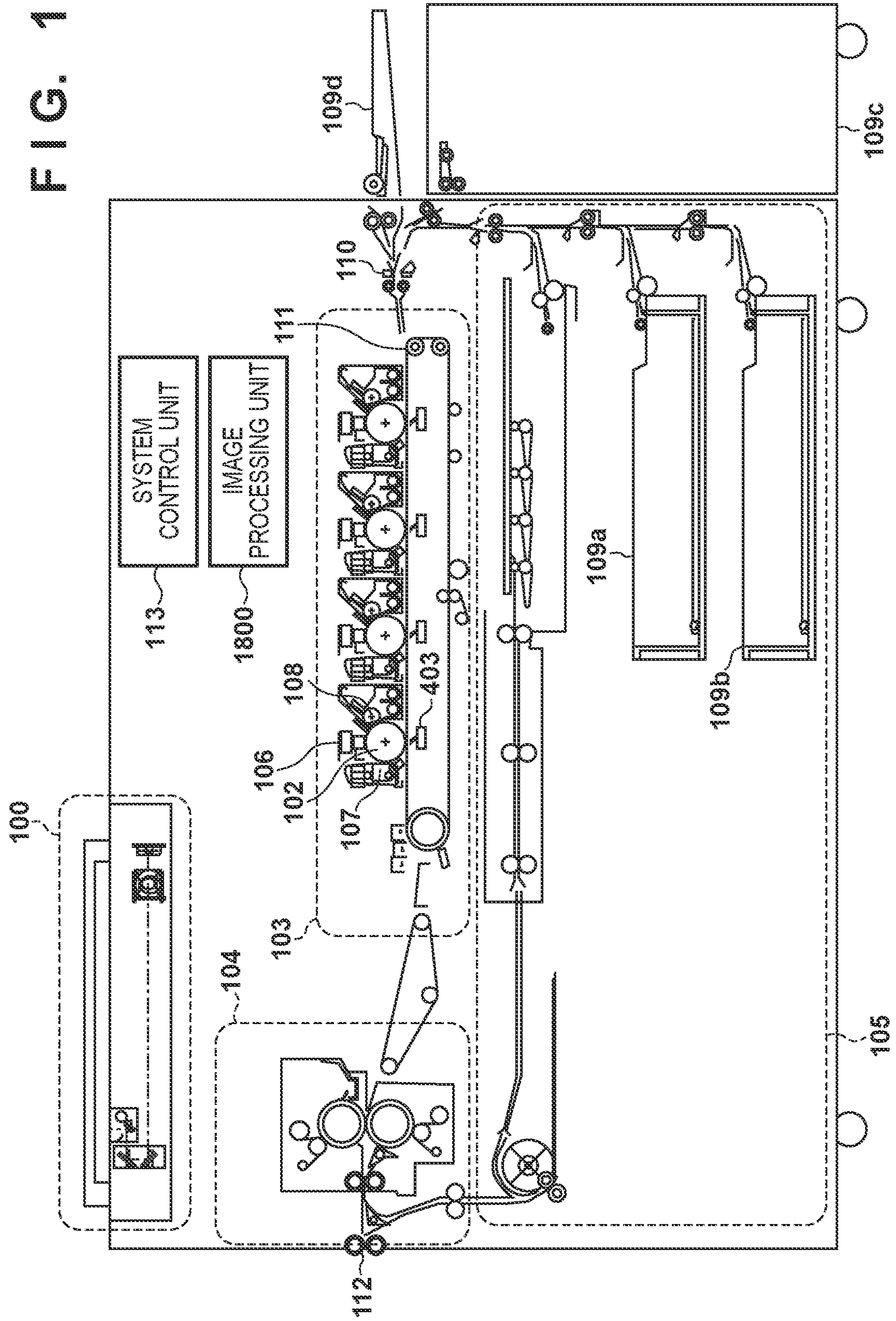
FIG. 1 is a configuration diagram of an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming apparatus according to the present embodiment. The image forming apparatus forms an image on a sheet based on image data generated by a scanner unit 100 optically reading a document or image data received from a host computer via a network. An image forming section 103 includes four image forming units for forming images with yellow, magenta, cyan, and black toners. The configurations of the four image forming units are common, and the configuration and operation of one image forming unit will be described below.

When forming an image, the photoreceptor 102 is rotationally driven in a clockwise direction in the drawing. Here, a direction parallel to the rotation axis of the photoreceptor 102 is referred to as a main scanning direction. A direction orthogonal to the main scanning direction is referred to as a sub-scanning direction. In the photoreceptor 102, the sub-scanning direction corresponds to the circumferential direction of the photoreceptor 102. A charger 107 charges the surface of the photoreceptor 102 to be rotationally driven. An exposure head 106 exposes the charged photoreceptor 102 based on image data to form an electrostatic latent image on the photoreceptor 102. A developer 108 forms a toner image on the photoreceptor 102 by developing the electrostatic latent image with toner. The image formed on the photoreceptor 102 is transferred to a sheet conveyed on the transfer belt 111 by a transfer device 403. The sheet conveying direction corresponds to the sub-scanning direction. The surface speed of the transfer belt 111 corresponds to the conveyance speed of the sheet. While the sheet is conveyed on the transfer belt 111, the images on the four photoreceptors 102 are sequentially transferred onto the sheet in an overlapping manner, thereby forming a full-color image on the sheet.

A feed/conveyance unit 105 feeds a sheet placed on any of internal units 109*a* and 109*b*, an external unit 109*c*, and a manual insertion unit 109*d* to a conveyance path of the image forming apparatus, and then conveys the sheet along the conveyance path. A registration roller 110 adjusts timing so that an image formed on each photoreceptor 102 is transferred to a sheet, and sends the sheet to the transfer belt 111. A fixing unit 104 fixes the image to the sheet by heating and pressurizing the sheet to which the image has been transferred. After fixing the image, the sheet is discharged to the outside of the image forming apparatus by a discharge roller 112.

The system control unit 113 controls the entire image forming apparatus. When performing image formation on a sheet, the system control unit 113 outputs a start signal (to be referred to as "Top_in" hereinafter) indicating the start of image formation on the sheet to the image processing unit 1800. The timing at which Top_in is output is used in various controls such as the rotation of each photoreceptor 102, the light emission timing of each exposure head 106, and the sheet feeding timing. The image processing unit 1800 performs various types of image processing on the image data from the scanner unit 100 or the host computer, and generates a light emission control signal to each exposure head 106 based on the timing of Top_in is received from the system control unit 113. The light emission control signal is a signal used by the exposure head 106 to expose the corresponding photoreceptor 102. Details of the light emission control signal will be described later.

Figure 2A:
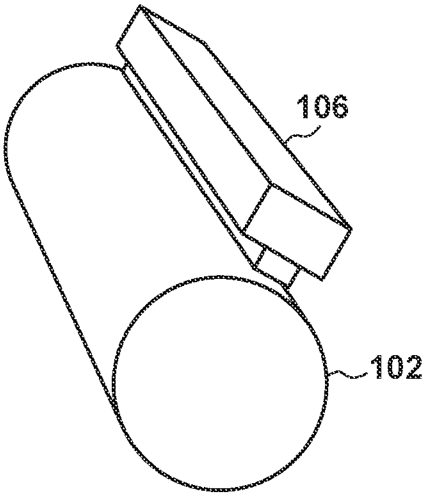
FIGS. 2A and 2B are configuration diagrams of an exposure head.
Figure 2B:
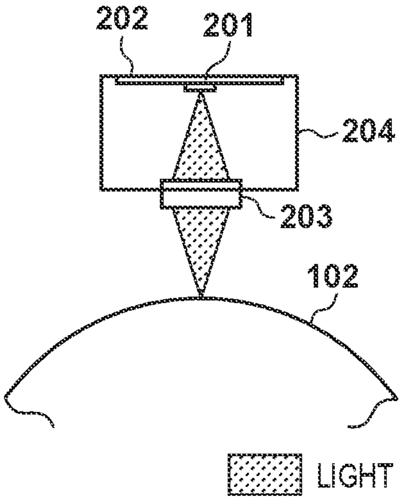

FIGS. 2A and 2B illustrate the photoconductor 102 and the exposure head 106. The exposure head 106 includes a light emitting element group 201, a printed board 202 on which the light emitting element group 201 is mounted, a rod lens array 203, and a housing 204 for attaching the rod lens array 203 to the printed board 202. The light emitting element group 201 includes a plurality of light emitting elements arranged along the main scanning direction. The light emitting element can be, for example, an inorganic electroluminescence (EL) or an organic EL. The rod lens array 203 condenses light emitted from each light emitting element of the light emitting element group 201 on the photoreceptor 102 to expose a line of the photoreceptor 102.

The direction of the line is a direction intersecting the circumferential direction of the photoreceptor 102 on the surface of the photoreceptor 102. An electrostatic latent image corresponding to an image to be transferred to one sheet is formed on the photoreceptor 102 by repeating exposure of lines by the light emitting element group 201 while rotating the photoreceptor 102. In this way, an image formed on one sheet is configured by a plurality of "lines" arranged along the sub-scanning direction.

Figure 3:
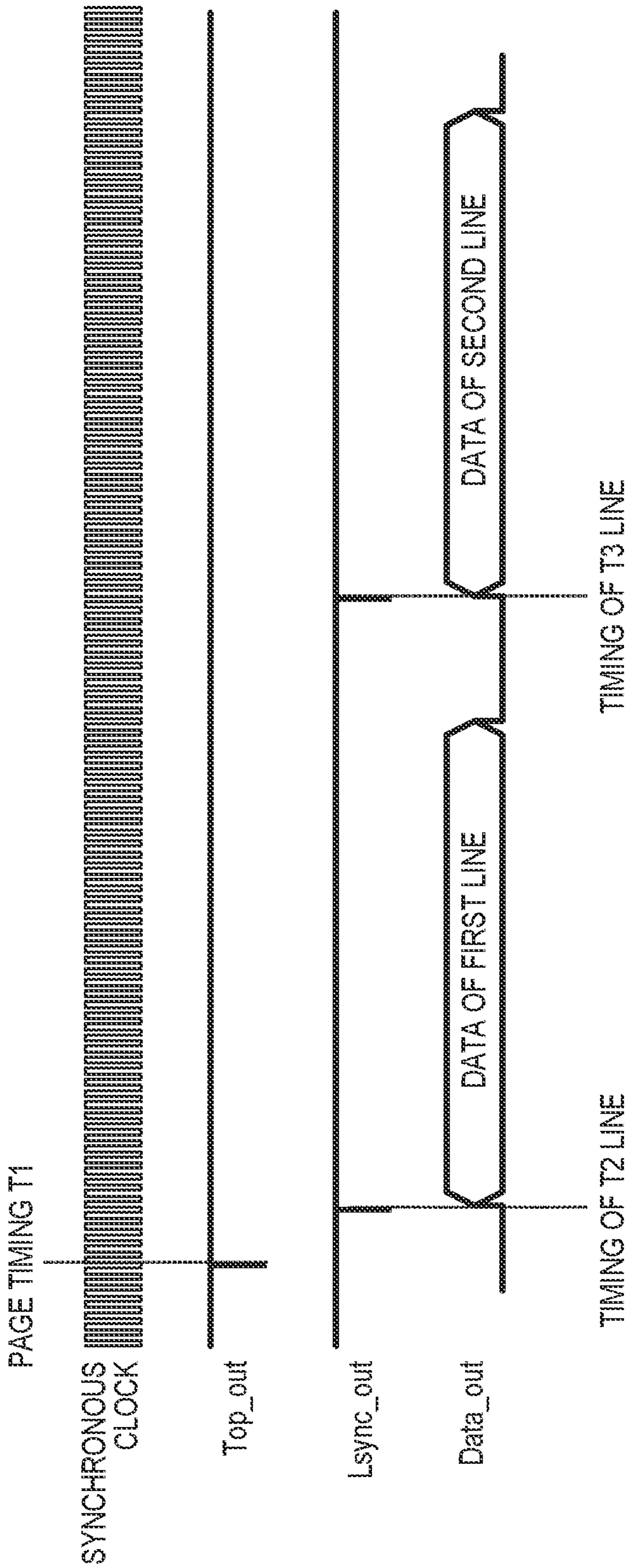
FIG. 3 is an explanatory diagram of a light emission control signal.

FIG. 3 is an explanatory diagram of the light emission control signal described above. The light emission control signal includes Top_out, Lsync_out, and Data_out. Top_out is a page synchronization signal indicating a timing (to be referred to as a page timing hereinafter) at which formation of an electrostatic latent image corresponding to an image to be formed on one sheet (page) is started. In this example, as illustrated in FIG. 3, the timing at which the level of Top_out becomes "Low" during one cycle of the synchronous clock is set as the page timing. Lsync_out is a line synchronization signal indicating a timing (Hereinafter, referred to as line timing) at which exposure of each line is started. In this example, as illustrated in FIG. 3, the timing at which the level of Lsync_out becomes "Low" during one cycle of the synchronization clock is set as the line timing. Data_out is a light emission data signal indicating a light emitting element that emits light and a light emitting element that does not emit light in each light emitting element of the light emitting element group 201 of the exposure head 106 in the exposure of each line.

Time T1 in FIG. 3 is a page timing, and thereafter, a process related to image formation on one sheet is started. Time T2 in FIG. 3 is the line timing of the first line, and time T3 is the line timing of the second line. When outputting Lsync_out of the first line, the image processing unit 1800 outputs Data_out of the first line to the exposure head 106. The exposure head 106 controls light emission or non-light emission of each light emitting element according to Data_out to perform line exposure. In a case where the margins are set on both sides of the line, Data_out is generated such that light emitting elements that expose the margin region included in the light emitting element group 201 of the exposure head 106 does not emit light. Interval between two consecutive lines in sub-scanning direction (hereinafter referred to as line interval) is based on a period from time T2 to time T3 in FIG. 3. More specifically, the line interval corresponds to the product of the period (hereinafter, a line period) from time T2 to time T3 and the surface speed (circumferential speed) of the photoreceptor 102. Therefore, the line interval can be made constant by making the line period, that is, the cycle of the line timing indicated by Lsync_out constant.

Figure 4:
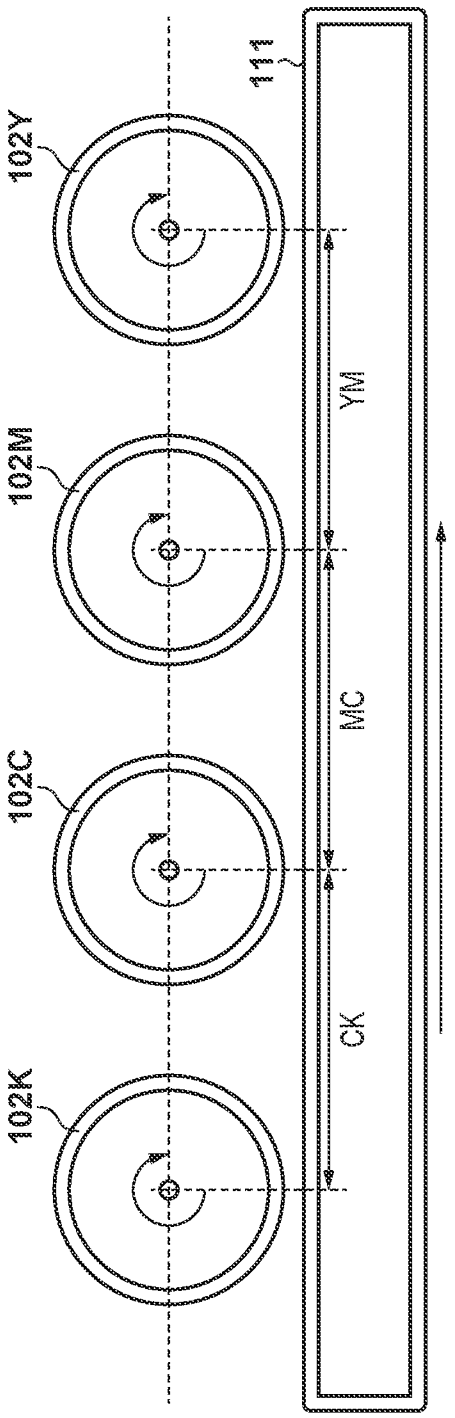
FIG. 4 is an explanatory diagram of an arrangement of four photoreceptors.

FIG. 4 shows the photoreceptor 102 of each of the four image forming units. In the following description, when the same members of the yellow, magenta, cyan, and black image forming units are to be distinguished from each other, letters Y, M, C, and K are added to the end of the reference numerals. As illustrated in FIG. 4, the four photoreceptors 102 are provided along the moving direction of the surface of the transfer belt 111. In FIG. 4, the distance between the center of the photoreceptor 102Y and the center of the photoreceptor 102M is YM, the distance between the center of the photoreceptor 102M and the center of the photoreceptor 102C is MC, and the distance between the center of the photoreceptor 102C and the center of the photoreceptor 102K is CK. Hereinafter, in order to simplify the description, it is assumed that distance YM=distance MC=distance CK. In FIG. 4, the photoreceptor 102Y, the photoreceptor 102M, the photoreceptor 102C, and the photoreceptor 102K are arranged in this order from the upstream side to the downstream side in the moving direction of the surface of the transfer belt 111. Therefore, the transfer of the image onto the sheet on the transfer belt 111 is performed in the order of the photoreceptor 102Y, the photoreceptor 102M, the photoreceptor 102C, and the photoreceptor 102K.

Since the transfer timing of the image from each photoreceptor 102 to the sheet is different, the timing of exposing each photoreceptor 102 to start forming the electrostatic latent image is also different for each photoreceptor 102. In other words, the page timings indicated by Top_out output from the image processing unit 1800 to each of the exposure heads 106 are different from each other. To be more specific, the page timing indicated by Top_out to the exposure head 106M is later than the page timing indicated by Top_out to the exposure head 106Y by the period PD. Here, the period PD is a period required for the sheet to be conveyed by a distance YM (=distance MC=distance CK). Similarly, the page timing indicated by Top_out to the exposure head 106C is later than the page timing indicated by Top_out to the exposure head 106Y by the period 2PD. Furthermore, the page timing indicated by Top_out to the exposure head 106K is later than the page timing indicated by Top_out to the exposure head 106Y by the period 3PD.

Figure 5:
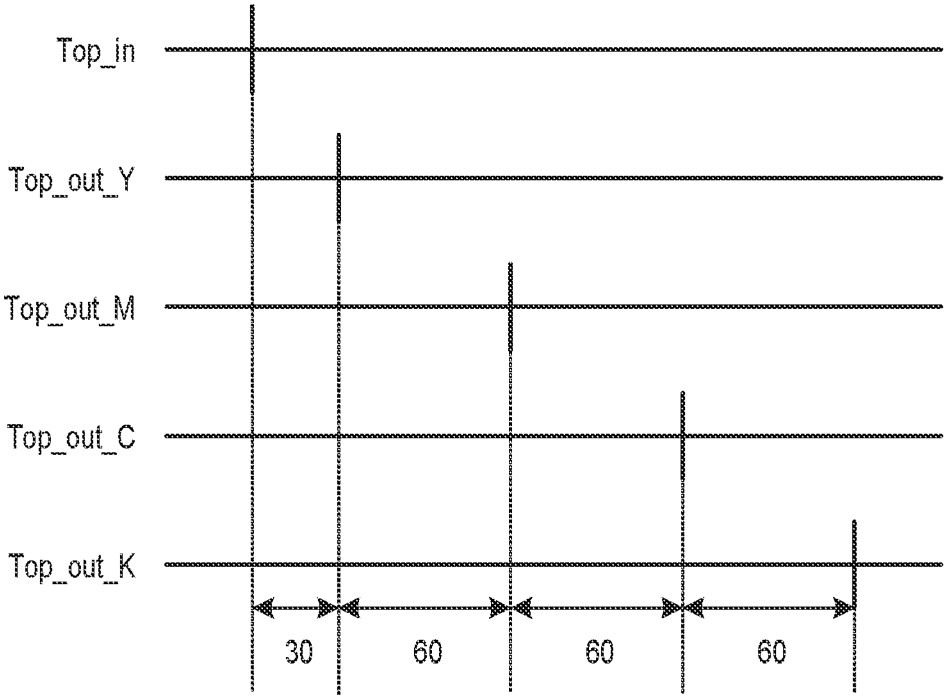
FIG. 5 is a diagram illustrating a relationship between a start signal and a page synchronization signal to each exposure head.

FIG. 5 shows an example of the timing of Top_in and the page timing indicated by Top_out to each exposure head 106. In the following description, characters Y, M, C, and K indicating colors are added at the end to distinguish Top_out of each of the exposure heads 106Y, 106M, 106C, and 106K. The same notation is used for Lsync_out and Data_out.

In FIG. 5, the page timing indicated by Top_out_Y is a timing after the timing at which Top_in is received from the system control unit 113 by a period corresponding to 30 lines. The period corresponding to 30 lines is 30 times the line period described above, that is, 30 times the period of the successive line timing. In FIG. 5, the page timing indicated by Top_out_M is a timing after the page timing indicated by Top_out_Y by a period corresponding to 60 lines. Furthermore, the page timing indicated by Top_out_C is a timing after the page timing indicated by Top_out_M by a period corresponding to 60 lines. Furthermore, the page timing indicated by Top_out_K is a timing after the page timing indicated by Top_out_C by a period corresponding to 60 lines. The period corresponding to the 60 lines corresponds to the period PD described above.

Figure 6:
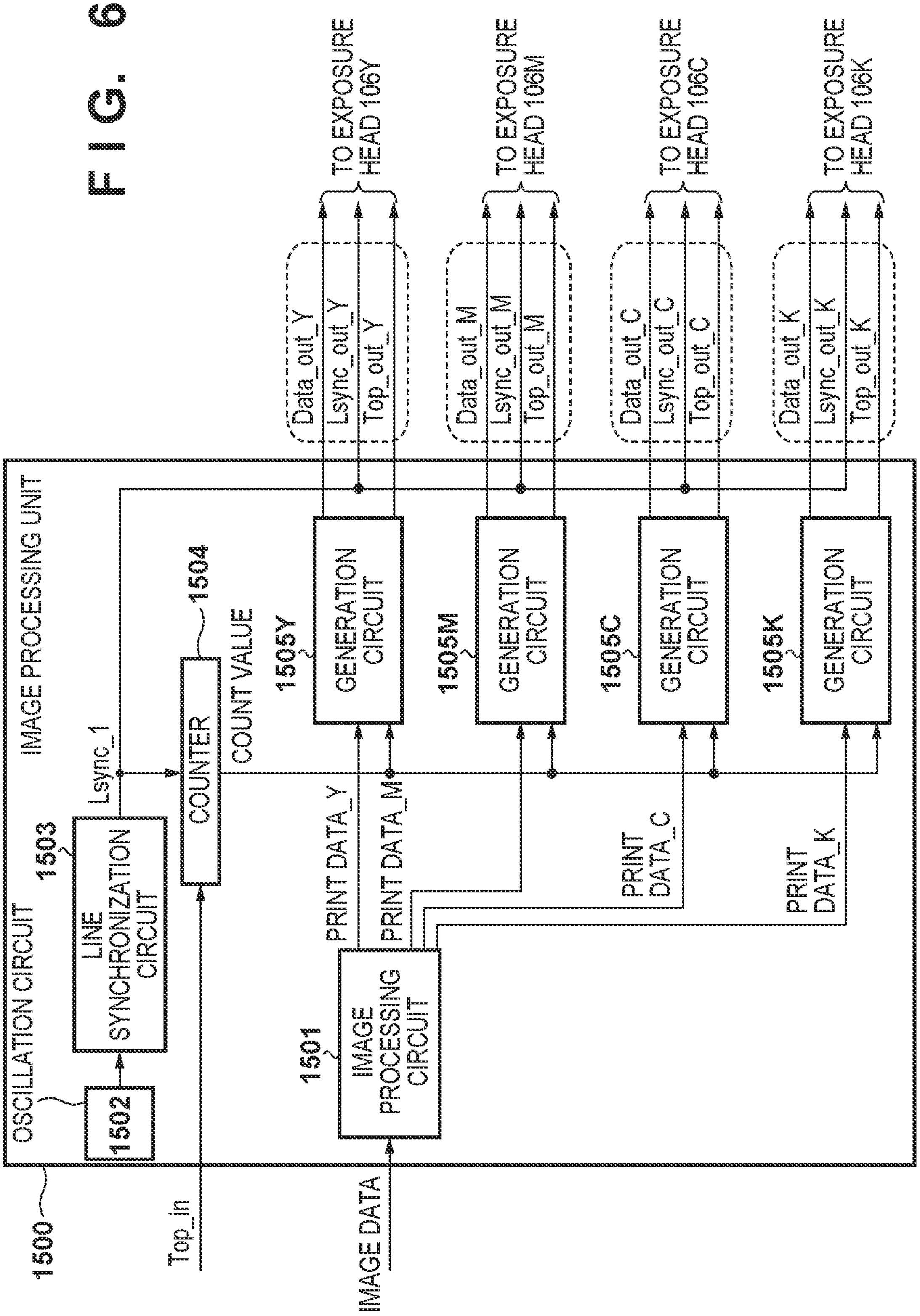
FIG. 6 is a configuration diagram of an image processing unit.

FIG. 6 illustrates a configuration of an image processing unit 1500 in a case where eccentricity of each photoreceptor 102 is not considered. Image data from the scanner unit 100 or an external host computer is input to the image processing circuit 1501. The image processing circuit 1501 performs various image processing such as color space conversion, trimming, varying magnification, and density conversion on the image data to generate print data of each of yellow, magenta, cyan, and black. The image processing circuit 1501 outputs the print data of yellow, magenta, cyan, and black to the generation circuits 1505Y, 1505M, 1505C, and 1505K, respectively.

An oscillation circuit 1502 of the image processing unit 1500 generates a synchronization clock. The line synchronization circuit 1503 generates Lsync_1 based on the synchronization clock. This Lsync_1 is directly used as Lsync_out_Y, Lsync_out_M, Lsync_out_C, and Lsync_out_K to each exposure head 106. Top_in from the system control unit 113 is input to the counter circuit 1504. The counter circuit 1504 resets the count value to 0 when Top_in is input, and then starts counting the line timing indicated by Lsync_1. The counter circuit 1504 outputs the count value to the generation circuits 1505Y, 1505M, 1505C, and 1505K.

Each of the generation circuits 1505Y, 1505M, 1505C, and 1505K determines the page timing based on the count value and outputs Top_out. For example, according to the example of FIG. 5, the generation circuit 1505Y outputs Top_out_Y indicating the timing at which the count value becomes 30 as the page timing. In addition, the generation circuit 1505M outputs Top_out_M indicating the timing at which the count value becomes 90 as the page timing. Furthermore, the generation circuit 1505C outputs Top_out_C indicating the timing at which the count value becomes 150 as the page timing. Furthermore, the generation circuit 1505K outputs Top_out_K indicating the timing at which the count value becomes 210 as the page timing. Moreover, each of the generation circuits 1505Y, 1505M, 1505C, and 1505K generates Data_out based on the print data from the image processing unit 1501 and outputs Data_out.

Figure 7:
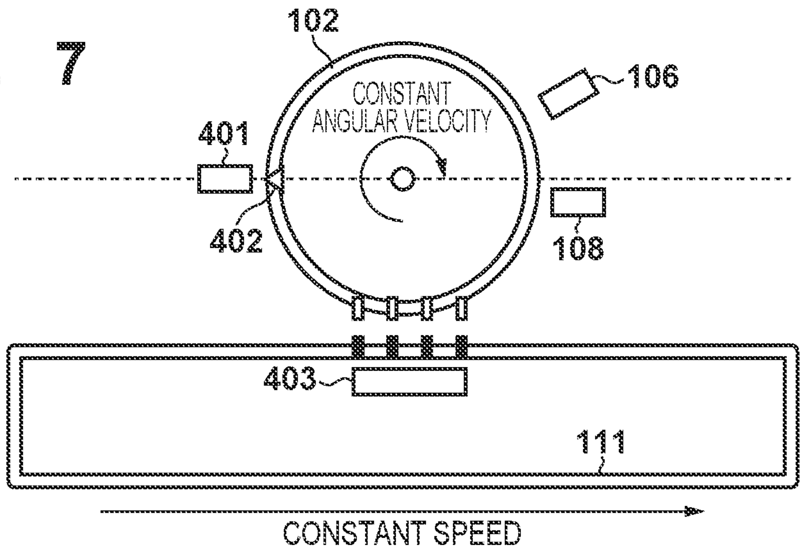
FIG. 7 is an explanatory diagram of the influence of fluctuation in the surface speed of the photoreceptor.
Figure 8:
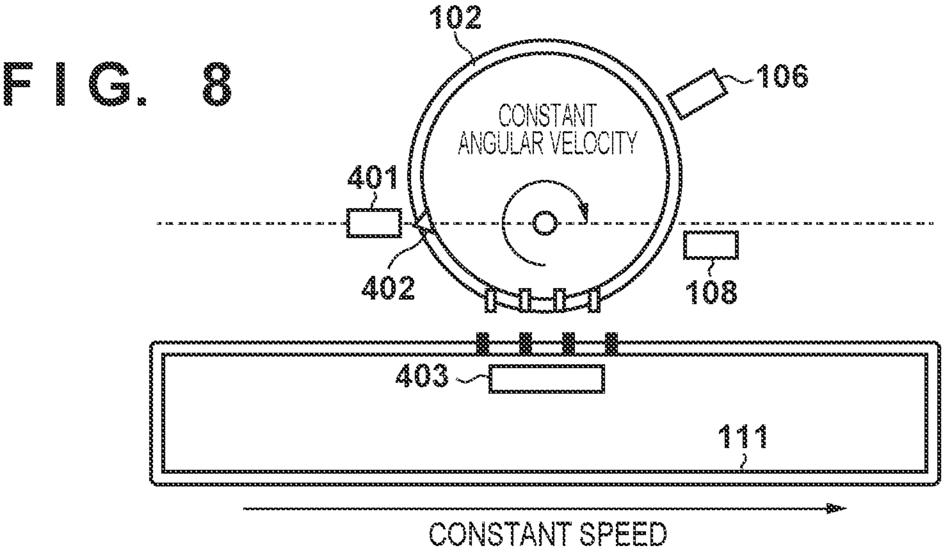
FIG. 8 is an explanatory diagram of the influence of fluctuation in the surface speed of the photoreceptor.
Figure 9:
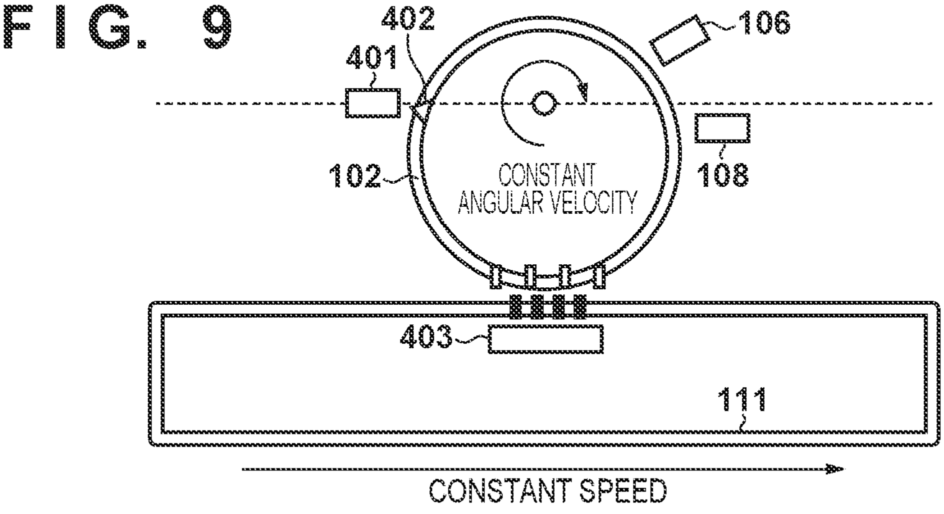
FIG. 9 is an explanatory diagram of the influence of fluctuation in the surface speed of the photoreceptor.

Next, the influence of the eccentricity of the photoreceptor 102, that is, in a case where the rotation axis of the photoreceptor 102 does not coincide with the center of the cross section of the photoreceptor 102 will be described with reference to FIGS. 7 to 9. Note that the angular velocity of the rotation axis of the photoreceptor 102 is constant, and the surface speed of the transfer belt 111 is also constant. In the following description, a region where the photoreceptor 102 and the transfer belt 111 are close to each other and the image of the photoreceptor 102 is transferred to the sheet on the transfer belt 111 is referred to as a "transfer region". In FIGS. 7 to 9, the outlined squares in the transfer region indicate "Line" on the photoreceptor 102 exposed by the exposure head 106 or "Toner on line". Furthermore, the black square of the transfer region indicates "Line" or "Toner on line" transferred to the transfer belt 111. Hereinafter, for the sake of explanation, it is assumed that the line of the photoreceptor 102 is transferred to the transfer belt 111, but the same applies to a case where the line is transferred to a sheet conveyed on the transfer belt 111.

As illustrated in FIGS. 7 to 9, in the present embodiment, a home position (HP) mark 402 is provided on the photoreceptor 102. The HP mark 402 is provided outside a region where an electrostatic latent image is formed on the photoreceptor 102, and is detected by the HP sensor 401. The HP sensor 401 outputs an HP signal indicating a timing at which the HP mark 402 is detected. The HP signal is used to detect the rotation phase of the photoreceptor 102. How the HP signal is used will be described later. In the present embodiment, in order to detect the rotation phase of the photoreceptor 102, the HP mark 402 is provided on the photoreceptor 102 and is detected by the HP sensor 401, but the configuration for detecting the rotation phase of the photoreceptor 102 is not limited thereto. For example, the rotation phase of the photoreceptor 102 can be detected by an encoder.

FIG. 7 shows a case where the photoreceptor 102 is not eccentric. Since the angular velocity of the rotation axis of the photoreceptor 102 is constant, the surface speed of the photoreceptor 102 is also constant. In this case, as illustrated in FIG. 7, the interval of the lines on the transfer belt 111 in the sub-scanning direction, that is, the line interval is constant. On the other hand, FIGS. 8 and 9 illustrate a case where the photoreceptor 102 is eccentric. When the photoreceptor 102 is eccentric, the surface speed of the photoreceptor 102 fluctuates every period during which the photoreceptor 102 makes one rotation. For example, as illustrated in FIG. 8, in a case where the surface of the photoreceptor 102 having a short distance from the rotation axis is in the transfer region, the surface speed of the photoreceptor 102 in the transfer region becomes slower than that in a case where there is no eccentricity. At this time, the line interval on the transfer belt 111 is wider than the line interval on the photoreceptor 102. On the other hand, as illustrated in FIG. 9, in a case where the surface of the photoreceptor 102 having a far distance from the rotation axis is in the transfer region, the surface speed of the photoreceptor 102 in the transfer region becomes faster than that in a case where there is no eccentricity. At this time, the line interval on the transfer belt 111 is narrower than the line interval on the photoreceptor 102.

Figure 10:
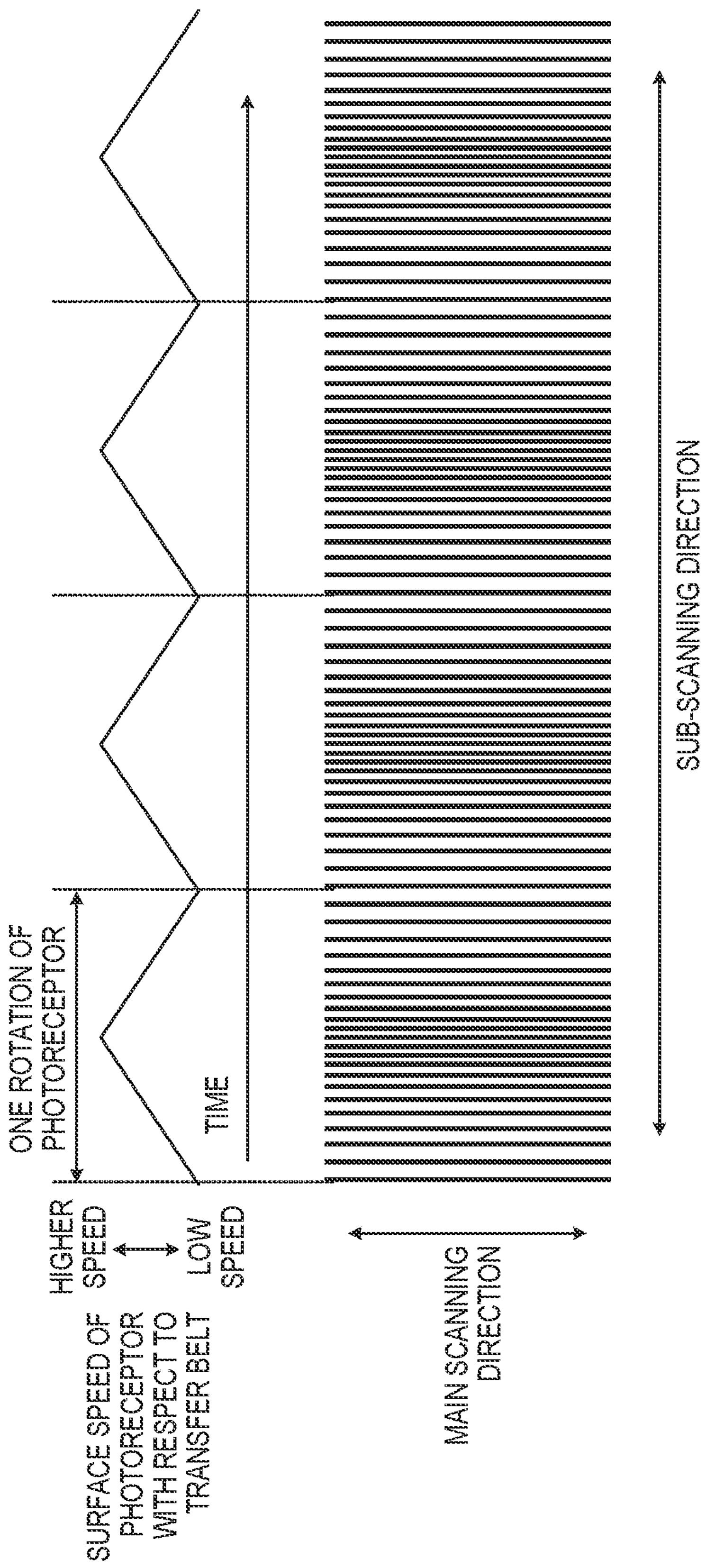
FIG. 10 is a diagram illustrating an image formed on a sheet when a surface speed of a photoreceptor fluctuates.

As described above, when the photoreceptor 102 is eccentric, the surface speed of the photoreceptor 102 in the transfer region fluctuates with the rotation cycle of the photoreceptor 102. FIG. 10 illustrates a "Line" of an image formed on a sheet conveyed by the transfer belt 111 when the photoreceptor 102 is eccentric. An image on one sheet is formed by rotating the photoreceptor 102 a plurality of times. As described with reference to FIGS. 8 and 9, as the surface speed of the photoreceptor 102 with respect to the transfer belt 111 increases, the line interval on the sheet becomes narrow, and as the surface speed of the photoreceptor 102 with respect to the transfer belt 111 decreases, the line interval on the sheet becomes wide. Due to the variation of the line interval, the image formed on the sheet expands and contracts. In addition, the density of the image formed on the sheet also fluctuates due to the fluctuation of the line interval. That is, the density is high in a region where the line interval is narrow, and the density is low in a region where the line interval is wide.

Figure 11:
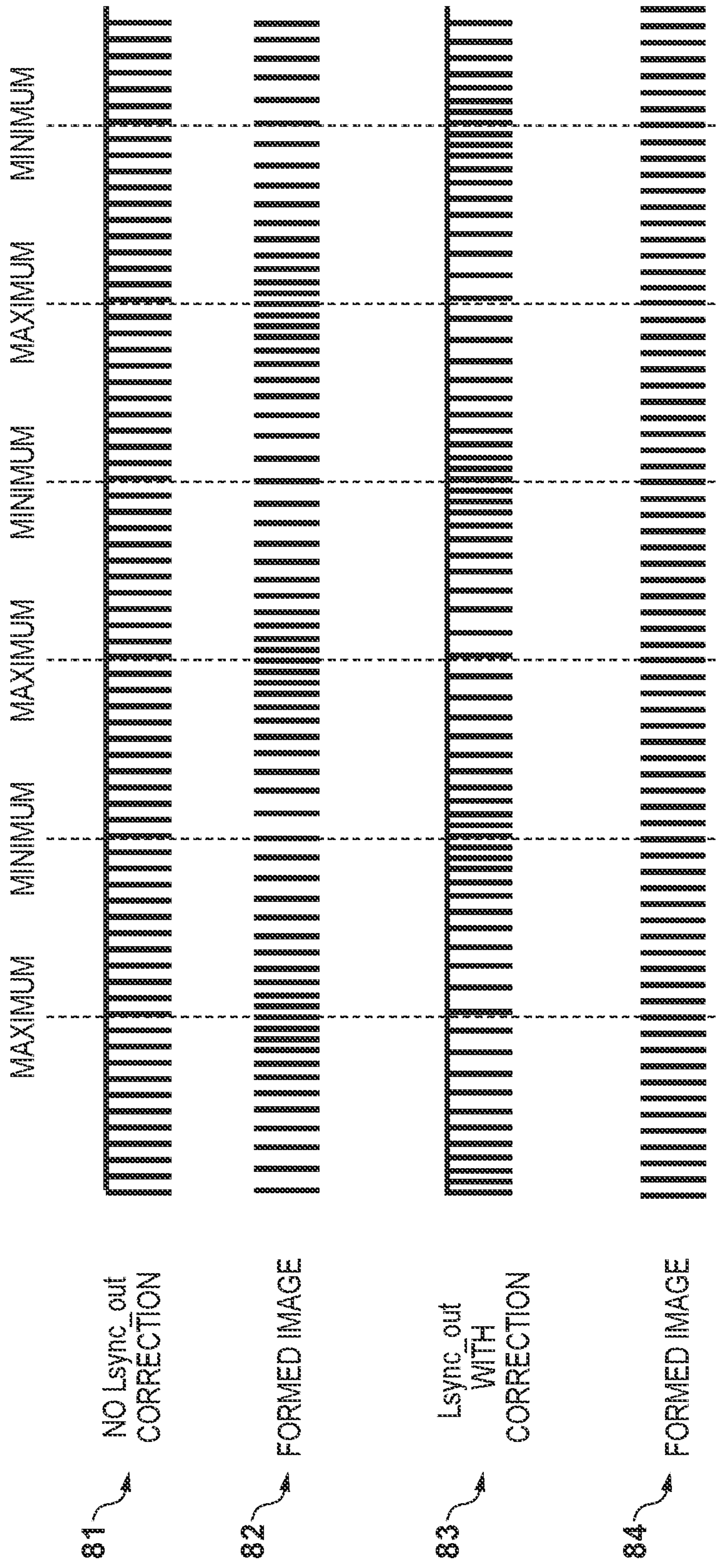
FIG. 11 is an explanatory diagram of a method of correcting a line synchronization signal.

In the present embodiment, in order to suppress the fluctuation in the line interval due to the fluctuation in the surface speed of the photoreceptor 102, the line timing indicated by Lsync_out is corrected according to the fluctuation in the surface speed of the photoreceptor 102. Reference numeral 81 in FIG. 11 indicates Lsync_out indicating periodic line timing. Reference numeral 82 indicates a state in which the line interval of the image formed on the sheet fluctuates due to the fluctuation in the surface speed of the photoreceptor 102 as described with reference to FIG. 10. Reference numeral 83 indicates Lsync_out after correction. As indicated by reference numeral 83, as the surface speed of the photoreceptor 102 increases, the time interval between the line timings indicated by Lsync_out is increased. Conversely, as the surface speed of the photoreceptor 102 decreases, the time interval between the line timings indicated by Lsync_out is shortened. By outputting Lsync_out in this manner, the fluctuation in the line interval due to the fluctuation in the surface speed of the photoreceptor 102 is canceled out by the fluctuation in the line interval due to the fluctuation in the time interval between the line timings indicated by Lsync_out. Therefore, as indicated by reference numeral 84, it is possible to suppress the fluctuation in the line interval of the image formed on the sheet.

Here, in the configuration of FIG. 6, Lsync_1 generated by the line synchronization circuit 1503 is used as Lsync_out to each exposure head 106. Since the fluctuation of the surface speed due to the eccentricity of each photoreceptor 102 differs for each photoreceptor 102, it is necessary to individually correct Lsync_out to each exposure head 106. However, in the configuration of FIG. 6, only the common Lsync_1 can be corrected. Furthermore, in the configuration of FIG. 6, the page timing to be notified to each exposure head 106 is determined by Top_out based on the count value of the line timing indicated by Lsync_1. Therefore, when Lsync_1 is corrected, the page timing notified to each exposure head 106 deviates from the ideal timing, and thus the formation start timing of the electrostatic latent image on each photoreceptor 102 deviates from the ideal timing. This means that the timing at which the image of each photoreceptor 102 is transferred to the sheet deviates from the ideal timing, which causes color shift.

Figure 12:
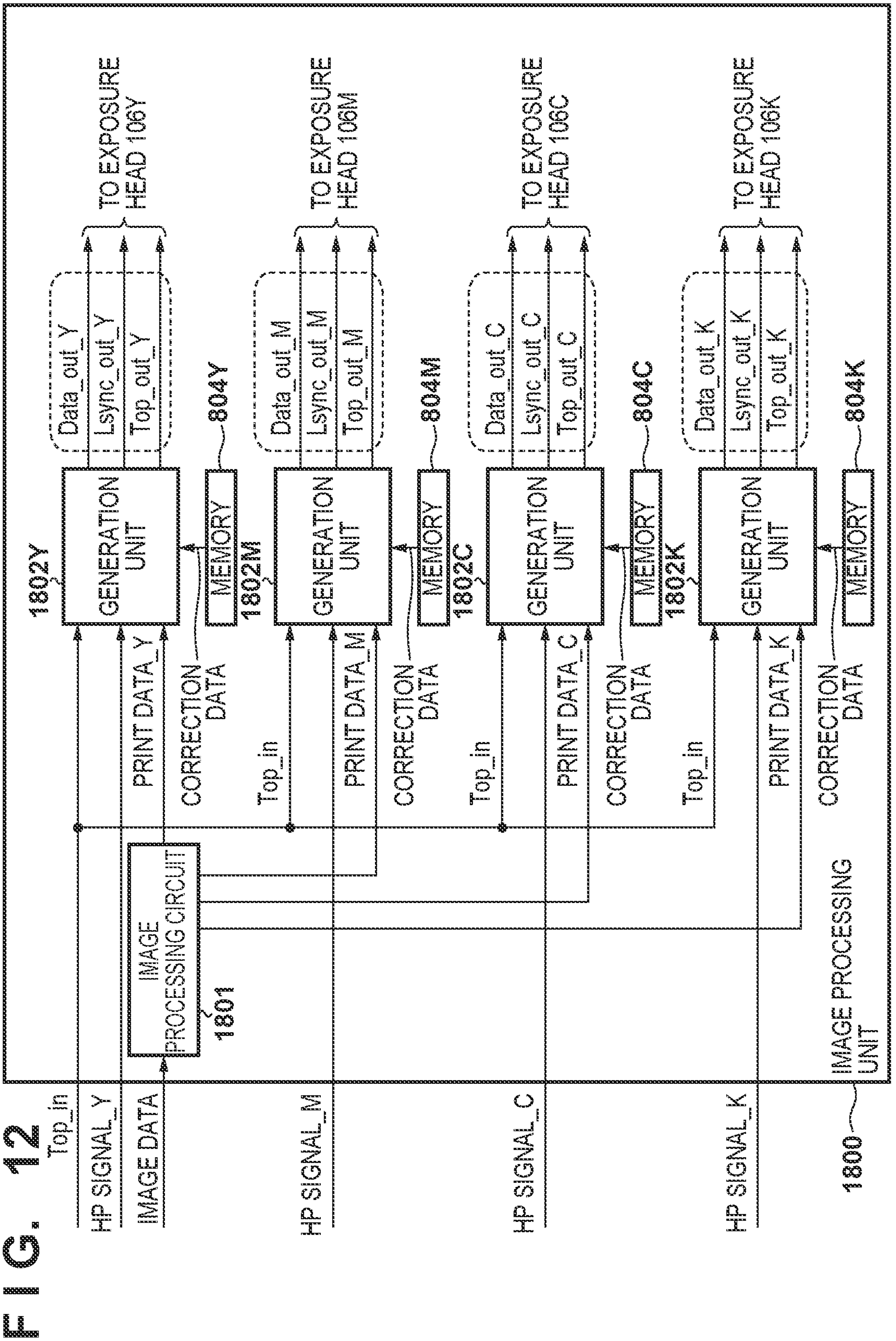
FIG. 12 is a configuration diagram of an image processing unit according to an embodiment.

Therefore, in the present embodiment, the image processing unit 1800 is configured as shown in FIG. 12. The Top_in from the system control unit 113, the HP signal_Y from the HP sensor 401Y, and the print data_Y from the image processing circuit 1801 are input to the generation unit 1802Y. The processing performed by the image processing circuit 1801 is similar to that of the image processing circuit 1501 in FIG. 6. Furthermore, the memory 804Y stores correction data used by the generation unit 1802Y. The generation unit 1802Y outputs Data_out_Y, Lsync_out_Y, and Top_out_Y to the exposure head 106Y. The above is the configuration for generating the light emission control signal to be output to the exposure head 106Y. The same applies to the configuration for generating the light emission control signal to be output to each of the exposure heads 106M, 106C, and 106K. That is, the configurations of the generation units 1802Y, 1802M, 1802C, and 1802K are the same, and hereinafter, collectively referred to as a generation unit 1802, and the configuration thereof will be described with reference to FIG. 13.

The oscillation circuit 1901 generates a synchronization clock. The reference line synchronization signal generation circuit 1902 generates Lsync_1 based on the synchronization clock. Lsync_1 is a signal indicating an ideal line timing, that is, a line timing of a predetermined cycle. In the following description, the line timing indicated by Lsync_1 is referred to as a reference line timing. Lsync_1 is a reference line synchronization signal indicating a reference line timing which is an ideal line timing.

The correction circuit 1905 corrects Lsync_1 based on the HP signal and the correction data to generate Lsync_int. The line timing indicated by Lsync_int is obtained by correcting the reference line timing in accordance with the correction data. In this way, Lsync_int is a corrected line synchronization signal indicating a corrected line timing obtained by correcting the reference line timing. Hereinafter, first, an example of a method of generating correction data will be described. In the following description, the rotation phase of the photoreceptor 102 at the timing when the HP sensor 401 detects the HP mark 402 is referred to as a reference phase. The surface speed of the photoreceptor 102 when the photoreceptor 102 is not eccentric is referred to as a reference speed.

First, the photoreceptor 102 is rotated once, and during the rotation, the relationship between the rotation phase of the photoreceptor 102 and the surface speed of the photoreceptor 102 in the transfer region is measured. Then, the speed difference between the surface speed of the photoreceptor 102 and the reference speed is obtained, and the relationship between the rotation phase of the photoreceptor 102 and the surface speed of the photoreceptor 102 in the transfer region is converted into the relationship between the rotation phase of the photoreceptor 102 and the speed difference. Note that in this example, the speed difference is a value obtained by subtracting the reference speed from the surface speed. That is, the speed difference when the surface speed of the photoreceptor 102 is higher than the reference speed is set to a positive value, and the speed difference when the surface speed of the photoreceptor 102 is lower than the reference speed is set to a negative value. Finally, correction data indicating the relationship between the rotation phase and the adjustment amount of the reference line timing is generated based on the relationship between the rotation phase and the speed difference. Note that in the rotation phase in which the speed difference is a positive value, the adjustment amount is a value indicating to delay the reference line timing indicated by Lsync_1. On the other hand, in a rotation phase in which the speed difference is a negative value, the adjustment amount becomes a value indicating to advance the reference line timing indicated by Lsync_1. Furthermore, the larger the absolute value of the speed difference, the larger the absolute value of the adjustment amount. The correction circuit 1905 determines the rotation phase of the photoreceptor 102 based on the HP signal, determines the adjustment amount based on the correction data and the determined rotation phase, and adjusts the reference line timing by the determined adjustment amount to output Lsync_int.

The counter 1906 counts the line timing indicated by Lync_int and outputs a count value. Note that the counter 1906 resets the count value to 0 in response to input of Top_in from the system control unit 113. The Top_out generation circuit 1907 determines arrival of page timing based on the count value and generates Top_out to be output to the exposure head 106. For example, in the case of following the example of FIG. 5, the Top_out generation circuit 1907 of the generation unit 1802Y determines that the page timing has arrived when the count value becomes 30. Similarly, the Top_out generation circuit 1907 of the generation unit 1802 M determines that the page timing has arrived when the count value becomes 90.

The Lsync_out generation circuit 1908 controls whether or not to output Lsync_int as Lsync_out based on the count value. Specifically, Lsync_int is not output as Lync_out while the count value of the counter 1906 is from 0 to a predetermined value, and Lsync_int is output as Lync_out after the count value reaches the predetermined value. This predetermined value corresponds to time T2 in FIG. 3. For example, it is assumed that a difference between time T1 and time T2 in FIG. 3 corresponds to a period of 40 lines. In the case of following the example of FIG. 5, time T1 is a timing at which the count value becomes 30. Therefore, in this case, the Lsync_out generation circuit 1908 of the generation unit 1802Y outputs Lsync_int as Lsync_out_Y when the count value becomes 70.

A margin information storage unit 1909 stores margin information indicating the size of the margin on the leading end side in the sheet conveying direction according to the user setting.

The margin information is indicated by, for example, the number of lines. Data_out generation circuit 1910 determines a timing to output Data_out based on the print data and the margin information. For example, it is assumed that the margin information is 10 lines and the timing at which the count value becomes 70 is the timing of the first line indicated by Lsync_out. In this case, the Data_out generation circuit 1910 outputs Data_out to the exposure head 106 from the timing when the count value becomes 80. Note that, in the present embodiment, Data_out is not output for the line included in the margin on the leading end side, but Data_out may be output for the line included in the margin on the leading end side. In this case, Data_out for the line included in the margin on the leading end side indicates that all the light emitting elements do not emit light, and is output from the timing of the first line. The same applies to the margin on the rear end side of the sheet in the conveying direction.

As described above, each generation unit 1802 generates the corrected line synchronization signal (Lsync_int) by correcting the ideal reference line synchronization signal (Lsync_1) generated based on the synchronization clock with the correction data of each photoreceptor 102. Then, each generation unit 1802 individually generates a line synchronization signal to each exposure head 106 based on the corrected line synchronization signal. With this configuration, it is possible to individually suppress the fluctuation in the line interval due to the fluctuation in the surface speed of each photoreceptor 102. Furthermore, each generation unit 1802 counts the corrected line synchronization signal to generate a page synchronization signal (Top_out) to each exposure head 106. In each generation unit 1802, the page synchronization signal is generated using the count value based on the corrected line synchronization signal, so that the deviation of the formation start timing of the electrostatic latent image on each photoreceptor 102 from the ideal timing can be suppressed. Therefore, it is possible to suppress a shift in timing of transferring the image of each of the photoreceptor 102 to the sheet, and it is possible to suppress occurrence of color shift.

Figure 13:
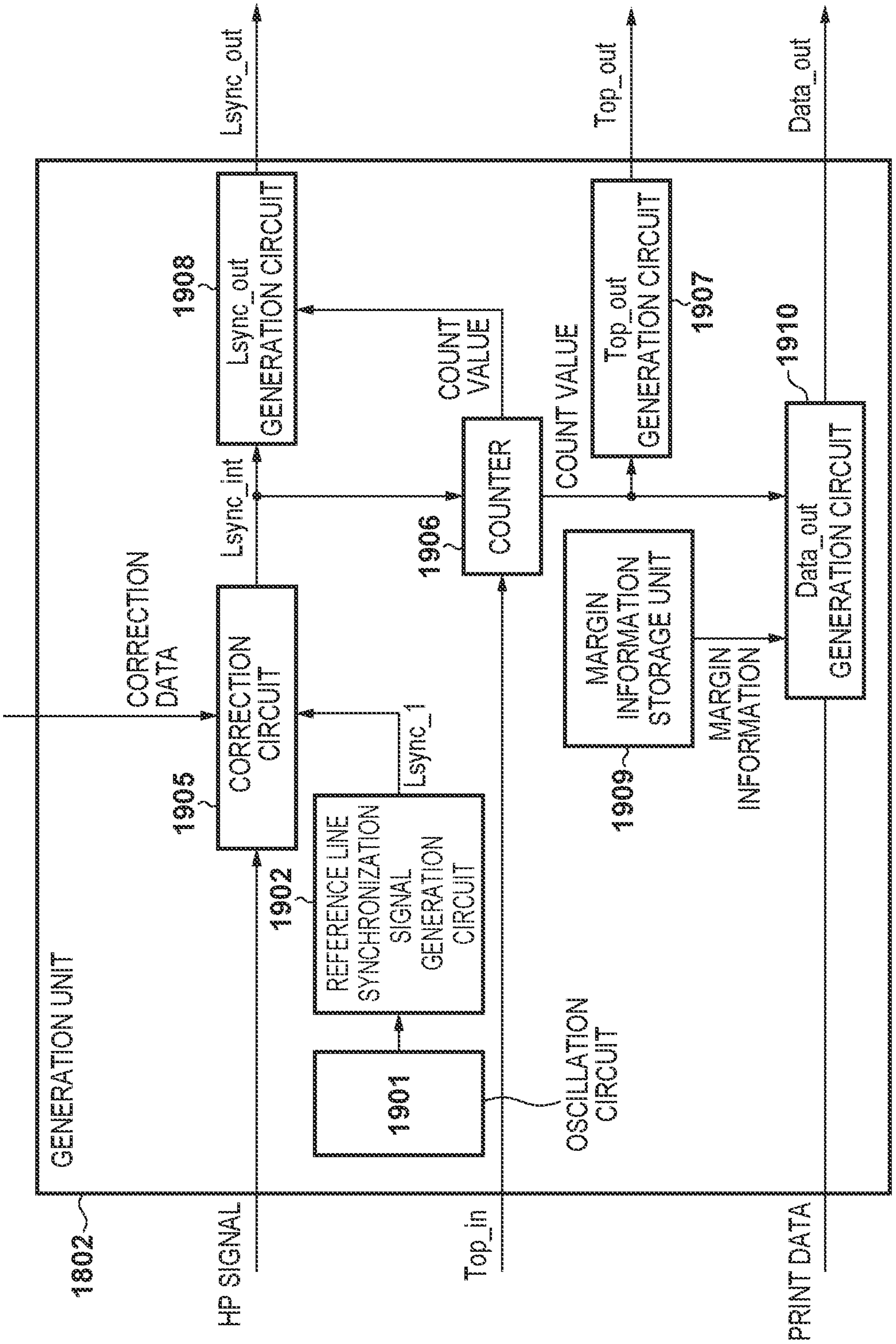
FIG. 13 is a configuration diagram of a generation unit according to an embodiment.

Note that, in the configurations of FIGS. 12 and 13, the oscillation circuit 1901 that generates the synchronization clock is provided in each of the generation units 1802, but the synchronization clock generated by one oscillation circuit may be distributed to each of the generation units 1802. Furthermore, in the configurations of FIGS. 12 and 13, the reference line synchronization signal generation circuit 1902 that generates Lsync_1 is provided in each generation unit 1802, but Lsync_1 generated by one reference line synchronization signal generation circuit may be distributed to each generation unit 1802.

Note that the image forming apparatus according to the embodiment includes four image forming units, each including a pair of the photoreceptor 102 and the exposure head 106, and the image processing unit 1800 includes four generation units 1802 corresponding to the image forming units. However, the number of the image forming units and the number of the generation units 1802 corresponding to the image forming units are not limited to four, and may be N, which is an integer greater than or equal to 2.

In addition, although the image forming apparatus of the embodiment directly transfers the image formed on the photoreceptor 102 to the sheet, the image forming apparatus may transfer the image to the sheet via an intermediate transfer body. In this case, the conveyance speed of the sheet or the surface speed of the transfer belt 111 in the above embodiment is the surface speed of the intermediate transfer body. Furthermore, the image forming apparatus of the embodiment uses the exposure head 106 including the plurality of light emitting elements arranged along the main scanning direction as an exposure unit. However, the image forming apparatus may use an exposure unit that forms an electrostatic latent image while scanning the rotationally driven photoreceptor 102 in the main scanning direction with scanning light.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-204640, filed Dec. 21, 2022, which is hereby incorporated by reference herein in its entirety.

What is claimed is:

1. An image forming apparatus comprising:

a plurality of photoreceptors;

a plurality of exposure heads provided so as to correspond to the plurality of photoreceptors, respectively, each of the plurality of exposure heads including a plurality of light emitting units configured to emit light for exposing the corresponding photoreceptor, the plurality of light emitting units being arranged along a rotation axis line of the corresponding photoreceptor; and a generation unit configured to periodically generate a line synchronization signal for each of the plurality of exposure heads to control a light emission timing in a rotating direction of the corresponding photoreceptor, the generation unit being configured to adjust a cycle of the line synchronization signal in accordance with each of the plurality of exposure heads.

2. The image forming apparatus according to claim 1, wherein the generation unit generates the line synchronization signal in a cycle in which the surface of the photoreceptor moves by a resolution corresponding to a rotating direction of the photoreceptor in the image forming apparatus.

3. The image forming apparatus according to claim 1, further comprising:

a plurality of detection units provided so as to correspond to the plurality of photoreceptors, respectively, each of the plurality of detection units being configured to detect a rotation phase of the corresponding photoreceptor; wherein the generation unit adjusts the cycle of the line synchronization signal based on the rotation phase of each photoreceptor detected by the plurality of detection units.

4. The image forming apparatus according to claim 1, wherein the generation unit generates the line synchronization signal based on a synchronization clock.

5. The image forming apparatus according to claim 1, further comprising:

a plurality of page synchronization signal generation units provided so as to correspond to the plurality of exposure heads, respectively, each of the plurality of page synchronization signal generation units being configured to output a page synchronization signal for determining a start timing at which the corresponding exposure head starts to latent image formation of an image for one page; wherein output of the line synchronization signal is started after the page synchronization signal is output.

6. The image forming apparatus according to claim 5, wherein each of the plurality of page synchronization signal generation units generates the page synchronization signal when a value obtained by counting the line synchronization signal output to the corresponding exposure head reaches a predetermined value.

7. The image forming apparatus according to claim 6, wherein the predetermined value is a timing at which transfer of image data for one page is ended.

8. The image forming apparatus according to claim 1, wherein the plurality of light emitting units are organic electroluminescence.

9. The image forming apparatus according to claim 1, wherein the generation unit adjusts the cycle of the line synchronization signal based on a rotation speed of the plurality of photoreceptors.

* * * * *